UNITED STATES PATENT OFFICE 2,504,617

P-DIALKYLAMINOSTYRYL DYES CONTAINING A NEW GROUP ATTACHED TO THE NITROGEN ATOM OF THE HETEROCYCLIC NITROGEN NUCLEUS

Alfred W. Anish, Vestal, N. Y., assignor to General Aniline & Film Corporation, New York, N. Y., a corporation of Delaware No Drawing. Application June 4, 1949,
Serial No. 97,306

4 Claims. (Cl. 260—240.9)

This invention relates to p-dialkylaminostyryl dyes containing a new group attached to the nitrogen atom of the heterocyclic nitrogenous nucleus.

Sensitizing dyes used with silver-halide emulsions must not only provide the desired sensitivity, but must meet other requirements chief of which are non-diffusibility in the emulsion, and solubility in liquids used for adding the dye to the emulsion. A dye selected for its sensitizing power need not and usually does not have such other prerequisites.

It is known that variations of the structure of a sensitizing dye lead to changes in its sensitizing characteristics. Hence, if a dye be satisfactory from the standpoint of its sensitivity, but deficient from the standpoint of solubility or diffusibility, and it is attempted to cure the deficiency by the introduction of substituents changing the dye molecule, a modification of the sensitizing characteristics necessarily ensues.

It is recognized in the art that the greater the molecular weight of a product, the lower its solubility, discounting, of course, the presence of solubilizing groups. Hence, if a sensitizing dye is deficient from the standpoint of diffusibility and satisfactory from the standpoint of solubility a change in the size of the molecule to cure the deficiency causes a lessening of solubility.

It is also a truism that the characteristics of a cyanine dye will not vary greatly if the aliphatic atom grouping attached thereto is varied within limits. Thus, it is possible to use interchangeably the low molecular weight aliphatic radicals ranging up to say 4 carbon atoms without a material modification of the properties of the dye. However, if this limit be exceeded to increase the size and hence the non-diffusibility of the dye as a whole, then again we find that the dye has undergone a marked departure in properties from those of the original.

I have now discovered that by introducing one or two methylene groups between a p-toluenesulfonate group and a nitrogenous heterocyclic system, compounds are obtained which, when utilized as alkylating or quaternizing agents for basic nitrogenous heterocyclic dye intermediates usually employed in the production of sensitizing dyes, yield dye salt intermediates which undergo a condensation reaction with p-dialkylamino aromatic aldehydes for the preparation of styryl dyes. The styryl dyes are characterized not only by their speed and gradation, but also by non-diffusing properties in multilayer films without any sacrifice in solubility.

It is an object of the present invention to provide a new class of p-dialkylaminostyryl dyes containing a new group attached to the nitrogen atom of the heterocyclic nitrogenous nucleus.

Other objects and advantages of this invention will become apparent by reference to the following specification in which its preferred details and embodiments are described.

I have found that when an aromatic primary amino compound, containing in addition a hydroxy, mercapto, or selenyl group in the ortho-position, is heated with glycolic or hydracrylic acid, azoles are obtained, which upon further treatment with p-toluenesulfonyl chloride, yield azole toluenesulfonic acid esters, which are excellent alkylating or quaternizing agents for basic heterocyclic nitrogenous intermediates usually employed in cyanine dyes.

The alkylating or quaternizing agents prepared according to the present invention are characterized by the following general formula:

(1)

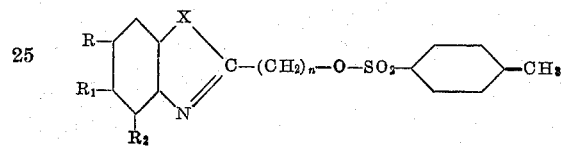

wherein R represents hydrogen, an aliphatic radical, such as an alkyl group, e. g., methyl, ethyl, propyl, butyl, and the like, alkoxy, e. g., methoxy, ethoxy, propoxy, etc., halogen, e. g., chlorine or bromine, or anilino group, $R_1$ represents either hydrogen, a halogen, or an aliphatic radical of the same value as R, R and $R_1$ together represent a methylenedioxy group, $R_2$ represents either hydrogen or an aliphatic group of the same value as R, X represents either oxygen, sulfur or selenium, and $n$ represents a numeral ranging from 1 to 2.

The aromatic primary amino compounds containing a hydroxy, mercapto, or selenyl group in the ortho-position and utilized as starting materials for the preparation of the above alkylating or quaternizing agents are represented by the following general formula:

(2)

wherein R, $R_1$, $R_2$, and X have the same values as above.

As representative examples of suitable compounds represented by the above Formula 2 may be mentioned:

2-amino-phenol
2-amino-phenyl mercaptan
2-amino-phenyl selenomercaptan
2-amino-5-methoxy-phenol
2-amino-5-ethoxy-phenyl mercaptan
2-amino-4,5-dimethoxy-phenyl mercaptan
2-amino-5-anilino-phenyl mercaptan
2-amino-5-chloro-phenyl mercaptan
2-amino-4,5-methylenedioxy-phenyl mercaptan
2-amino-3-methyl-phenyl mercaptan, and the like.

In preparing the quaternizing agents of the present invention, a molecular equivalent of an aromatic primary amine represented by Formula 2 is heated with a slight excess of a molecular equivalent of glycolic or hydracrylic acid represented by the general formula:

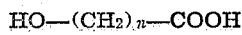

HO—(CH₂)ₙ—COOH wherein $n$ represents a numeral ranging from 1 to 2, at a temperature ranging from 120°–155° C. for several hours. The methods of isolating the resulting product vary with the nature of the aromatic primary amino compound and the organic acid employed in the condensation reaction. In the case where the reaction mixture consists of an ortho-amino-phenyl mercaptan, or ortho-amino-phenyl selenomercaptan and glycolic acid, the product is isolated by diluting the reaction mixture with water at room temperature, and a sufficient quantity of a mild oxidizing agent such as a 3% solution of hydrogen peroxide, aqueous solution of NaOH-potassium fericyanide, sodium peroxide, sodium perborate, oxygen, etc., is added until a solid precipitate ensues. The purpose of the oxidizing agent is to convert the unreacted phenyl mercaptan or phenyl selenomercaptan to the insoluble disulfide or diselenide. The precipitate is separated from the liquid portion of the reaction mixture, redissolved in a minimum amount of 3-N caustic soda solution, in which the 2-methylol azole is soluble, and the solution treated with a small quantity of charcoal, and the compound reprecipitated carefully by the addition of a 10% solution of acetic acid. An additional fraction of the final product may be obtained from the filtrate by salting out with sodium chloride.

Where the reaction mixture consists of an amino-phenyl mercaptan or amino-phenyl selenomercaptan, and hydracrylic acid, the unreacted portion of the amino-phenyl mercaptan, or amino-phenyl selenomercaptan, is extracted with a 4 to 10% solution of caustic soda in which the final product is insoluble, the extract rendered slightly acid, and the insoluble portion extracted with a water immiscible solvent such as ethyl ether, petroleum ether, benzene, and the like. The residue remaining after distilling off the ether is then subjected to a fractional distillation. The distillate obtained above 150° C., and 2 mm. pressure is utilized in the reaction with p-toluenesulfonyl chloride.

In the case where an aminophenol and glycolic or hydracrylic acid is used, the reaction mixture is extracted several times with ether, the extract dried with anhydrous sodium sulfate, and the ether distilled off. The oily residue remaining after distilling off the ether is subjected to a fractional distillation under reduced pressure. All of the distillate obtained above 150° C., at 2–3 mm. of pressure is mainly an alkylol benzoxazole, and utilized as such in the reaction with the p-toluenesulfonyl chloride.

One mol of the product as above obtained is dissolved in a sufficient quantity of 8-N caustic soda solution and the solution heated on a steam bath. To the hot solution, 1 mol of p-toluenesulfonyl chloride is added and the mixture allowed to stand at room temperature for 2 or more hours. The precipitated product is recovered by filtration, washed with water, the solid dried in air, and recrystallized from petroleum ether.

When a molecular equivalent of 2-aminophenyl mercaptan is heated with a slight excess of a molecular equivalent of glycolic acid and the resulting 2-methylol-benzothiazole reacted with p-toluenesulfonyl chloride, two reactions occur which may be written as follows:

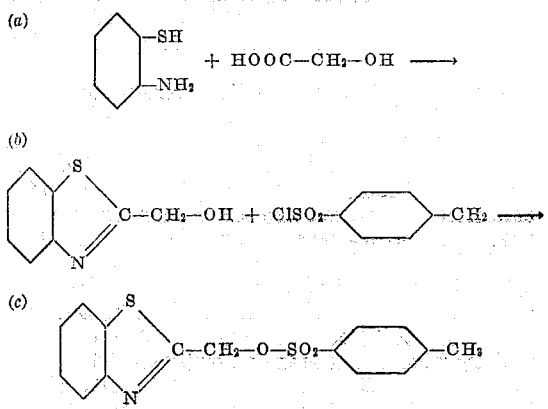

The toluenesulfonic ester (c) so prepared is then reacted with any one of the nitrogenous heterocyclic bases, usually employed in the synthesis of cyanine dyes, in the known manner, such as by heating in a sealed tube at a temperature ranging from 65° to 150° C. Another method comprises heating said ester and base at about 100° C., with a solvent-diluent, for a time sufficient for quaternization to take place.

The p-dialkylaminostyryl dyes containing a new group attached to the nitrogen atom of the heterocyclic nitrogenous nucleus prepared according to the present invention are characterized by the following general formula:

(3)

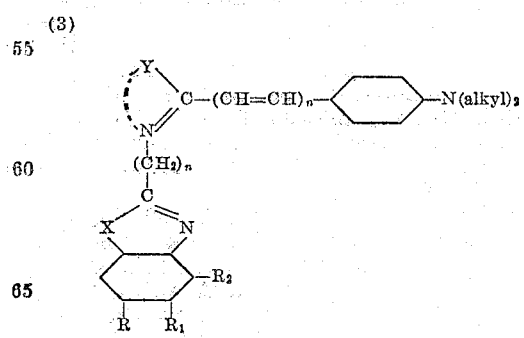

wherein R, R₁, R₂ and $n$ have the same values as in general Formula 1, and alkyl represents an alkyl chain of not more than four carbon atoms, such as methyl, ethyl, propyl, and butyl.

The following examples describe in detail the method for preparing the quaternizing agents and styryl dyes quaternized with said agents, but it is to be understood that they are presented merely for the purpose of illustration and are not to be considered as limitative.

Example I

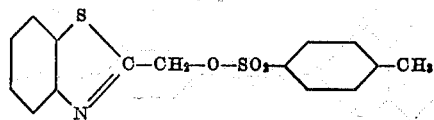

2-benzothiazolylmethyl p-toluenesulfonate

Sixty grams of 2-amino phenyl mercaptan and 42 grams of glycolic acid were heated together at 120°–155° C., for several hours. The mixture was poured into water at room temperature and 10 cc. of a 3% hydrogen peroxide solution added. The precipitate is separated from the liquid portion of the reaction mixture, redissolved in a minimum amount of 3-N caustic soda solution and filtered. A small quantity of charcoal was added, the product reprecipitated carefully by the addition of a 10% solution of acetic acid, and the solid product recovered and dried.

Sixty grams of the product as above obtained is dissolved in 500 cc. of 8-N caustic soda solution and the solution heated on a steam bath. To the hot solution 70 grams of p-toluenesulfonyl chloride was added and the mixture allowed to stand at room temperature for several hours. The precipitated product was cooled, filtered, washed with water, the solid dried in air, and recrystallized from petroleum ether.

Example II

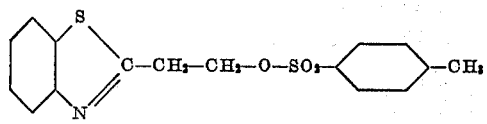

2-benzothiazolylmethyl p-toluenesulfonate

Fourteen grams of 2-amino phenyl mercaptan and 11 grams of hydracrylic acid were heated together at 140°–155° C. for 2 hours. The gummy product, which is soluble in acid but insoluble in alkali, was extracted with a 5% solution of caustic soda so as to remove any unreacted 2-amino phenyl mercaptan. The insoluble residue was extracted several times with ethyl ether, and the residue remaining after distilling off the ether was subjected to a fractional distillation above 150° C., and at 2 mm. pressure. The distillate obtained at 165–170° C. at 3 mm. pressure, was a yellowish-brown oil.

The yellowish-brown oil obtained as above was then reacted with p-toluenesulfonyl chloride as in Example I.

Example III

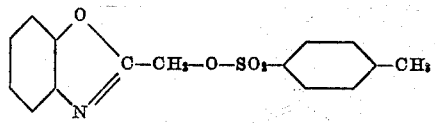

2-benzoxazolylmethyl p-tolenesulfonate

Fifty-four grams of 2-amino phenyl mercaptan and 42 grams of glycolic acid were heated together as in Example I. The reaction mixture was extracted several times with ether and then dried with anhydrous sodium sulfate. The residue remaining after distilling off the ether was subjected to fractional distillation under reduced pressure. The distillate obtained above 150° C., and at 2 mm. pressure, was mainly 2-methylol benzoxazole.

The 2-methylol benzoxazole as above obtained was then reacted with p-toluenesulfonyl chloride as in Example I.

Example IV

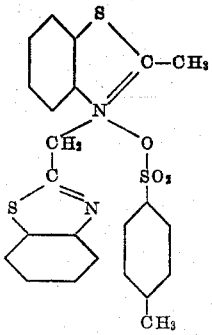

Five grams of 2-methylolbenzothiazole and 5 grams of 2-benzothiazolylmethyl p-toluenesulfonate were heated together in a tube in an oil bath for 4 hours at 100° C. The crude solid was ground with an ether-acetone mixture, washed with acetone, and finally dried.

Example V

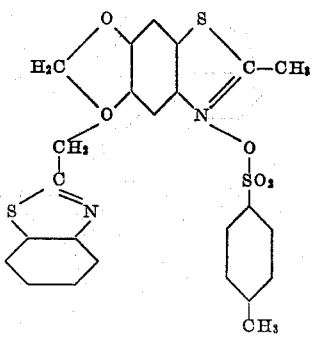

Three grams of 2-methyl-5,6-methylenedioxy benzothiazole and 5 grams of 2-benzothiazolylmethyl p-toluenesulfonate were heated together in a tube in an oil bath for 3 hours at 100° C. The crude solid was pulverized in an ether-acetone mixture and washed with acetone.

Example VI

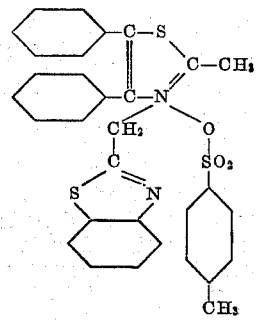

Five grams of 4,5-diphenyl-2-methyl thiazole and 5 grams of 2-benzothiazolylmethyl p-toluenesulfonate were heated together in a tube in an oil bath for 12 hours at 65–68° C. The crude brown solid was ground with an ether-acetone mixture and finally washed with acetone. The final product decomposes at 100° C.

Example VII

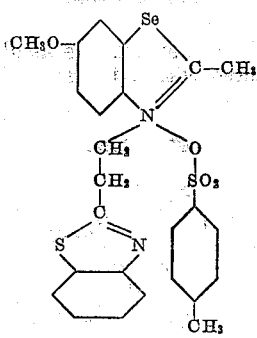

Five grams of 6-methoxy-2-methyl benzoselenazole and 5 grams of 2-benzothiazolylethyl p-toluenesulfonate were heated together in a tube in an oil bath for 12 hours at 65–68° C. The crude product was washed with an ether-acetone mixture and then acetone in a mortar. The final product decomposes at 100° C.

Example VIII

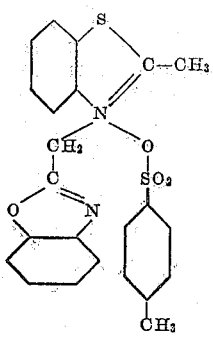

Five grams each of 2-methyl benzothiazole and 2 - benzoxazolylmethyl p - toluenesulfonate were heated together in a tube in an oil bath for 4–5 hours at 100° C. The crude solid was pulverized in an ether-acetone mixture and washed with acetone.

As stated above, the preceding examples are merely illustrative of the use of my new quaternizing agents. It is to be understood that such agents are effective as quaternizing agents for any heterocyclic nitrogenous dyestuff intermediate of the type useful in preparing cyanine dyes, and irrespective of the chain length of the dyestuff, or grouping in 2-position to the nitrogen atom thereof.

The following examples illustrate the preparation of the styryl dyes quaternated with the new quaternizing agents. In preparing the styryl dyes, a molecular equivalent of a p-dialkylamino aromatic aldehyde, such as, for example:

p-Dimethylamino benzaldehyde
p-Diethylamino benzaldehyde
p-Dipropylamino benzaldehyde
p-Dibutylamino benzaldehyde
p-Dimethylamino cinnamic aldehyde
p-Diethylamino cinnamic aldehyde
p-Dipropylamino cinnamic aldehyde
p-Dibutylamino cinnamic aldehyde, and a molecular equivalent of a cyanine dye intermediate quaternated with the quaternizing agents of the present invention and containing a reactive methyl group in α-position to the nitrogen atom thereof are dissolved in a sufficient amount of pyridine to effect solution and the mixture heated at an oil bath temperature measuring between 105–115° C. for 30–45 minutes. The dye which forms precipitates out upon distillation with water and the dye crystals may be recrystallized from methyl alcohol.

Example IX

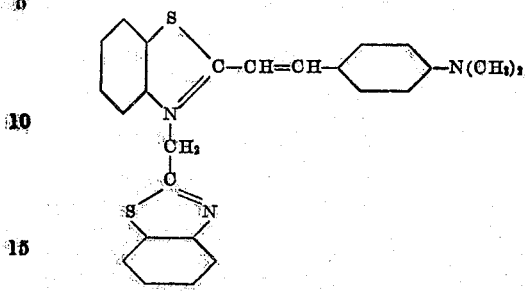

One and one-half grams of p-dimethylamino benzaldehyde and 4.8 grams of 2-methyl-3-(2-benzothiazolyl methyl) benzothiazole p-toluenesulfonate prepared according to Example IV were dissolved in 30.0 cc. of pyridine and the mixture heated at an oil bath temperature measuring 110° C. for 40 minutes. The dye which formed precipitated out upon dilution with water. The dye crystals were recrystallized from methyl alcohol and have an absorption maximum in alcoholic solution at about 555 mu.

Example X

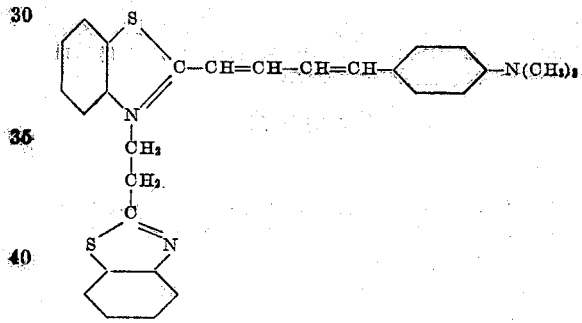

Four and eight-tenths grams of 2-methyl-3-(2-benzothiazolyl ethyl) benzothiazole p-toluenesulfonate and 2 grams of p-dimethylamino cinnamic aldehyde were dissolved in 30 cc. of pyridine and the mixture heated at an oil bath temperature measuring 110–115° C. for 45 minutes. The dye which formed precipitated out upon dilution with water. The dye crystals were recrystallized out from methyl alcohol. Its sensitizing speed in bromoiodide emulsions is greater than that of a corresponding dye having an ethyl group attached to the nitrogen atom of the benzothiazole nucleus.

Example XI

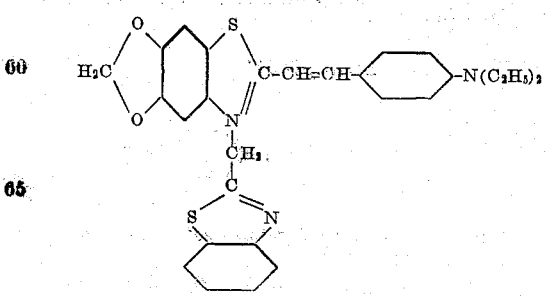

Four grams of 2-methyl-5,6-methylenedioxy-3-(2 - benzothiazolyl methyl)-benzothiazole p-toluenesulfonate prepared according to Example V and 1.7 grams of p-diethylamino benzaldehyde were treated in the same manner as in Example IX. The dye which formed precipitated out upon dilution with water and was recrystallized from methyl alcohol. The dye has a stronger sensitization in a silver-bromoiodide emulsion than the corresponding dye with an ethyl group on the nitrogen atom of the methylenedioxybenzothiazole nucleus.

The concentration of the styryl dyestuffs in silver-halide emulsions can vary widely, i. e., from about 1 to about 100 mg. per liter of flowable emulsion. The concentration of the dyestuff will vary according to the type of light-sensitive material in the emulsion and according to the effect desired. The suitable and most economical concentration for any given emulsion will be apparent to those skilled in the art upon making the ordinary tests and observations customarily used in the art of emulsion making.

This application is a continuation-in-part of my pending application Serial No. 708,473, filed November 7, 1946.

While there have been pointed out above certain preferred embodiments of the invention, the same is not limited to the foregoing examples, illustrations or to the specific details given therein, but is capable of variations and modifications as to the reactants, proportions and conditions employed. Accordingly, it is intended that the invention be defined only by the accompanying claims, in which it is intended to include all features of patentable novelty residing therein.

I claim:

1. A p-dialkylamino styryl dye characterized by the following general formula:

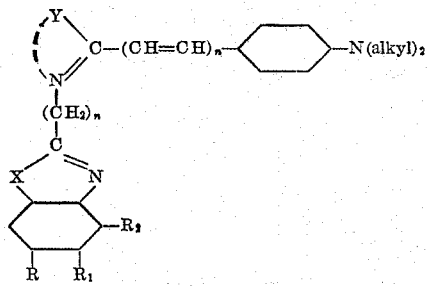

wherein alkyl represents an alkyl group of not more than four carbon atoms, R represents a member selected from the class consisting of hydrogen, halogen, aliphatic, and anilino groups, $R_1$ represents a member selected from the class consisting of hydrogen, halogen, and aliphatic groups, R and $R_1$ together represent a methylenedioxy group, $R_2$ represents a member selected from the class consisting of hydrogen and aliphatic groups, X represents a member selected from the class consisting of oxygen, sulfur, and selenium, Y represents the atoms necessary to complete a heterocyclic nitrogenous nucleus of the type useful in cyanine dyes, and $n$ represents a numeral ranging from 1 to 2.

2. A p-dimethylaminostyryl dye characterized by the following formula:

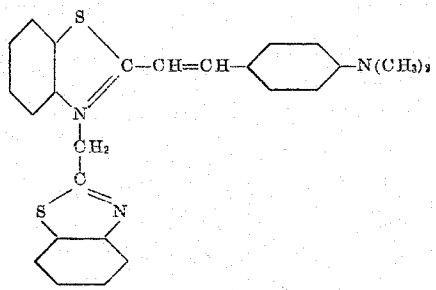

3. A p-dimethylaminostyryl dye characterized by the following formula:

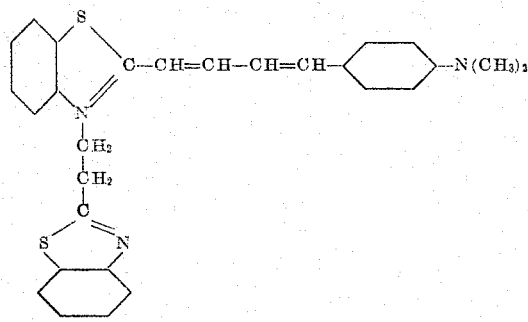

4. A p-diethylamino styryl dye characterized by the following formula:

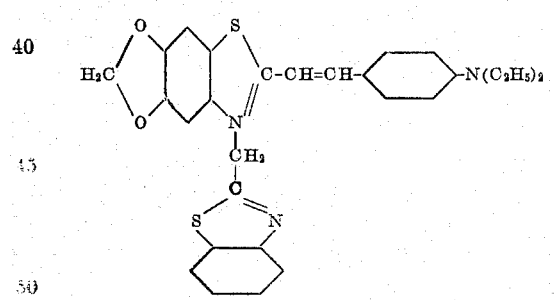

ALFRED W. ANISH.

No references cited.